Aug. 3, 1943.  W. H. KITTO  2,325,778
REFRIGERATION
Filed Sept. 8, 1941
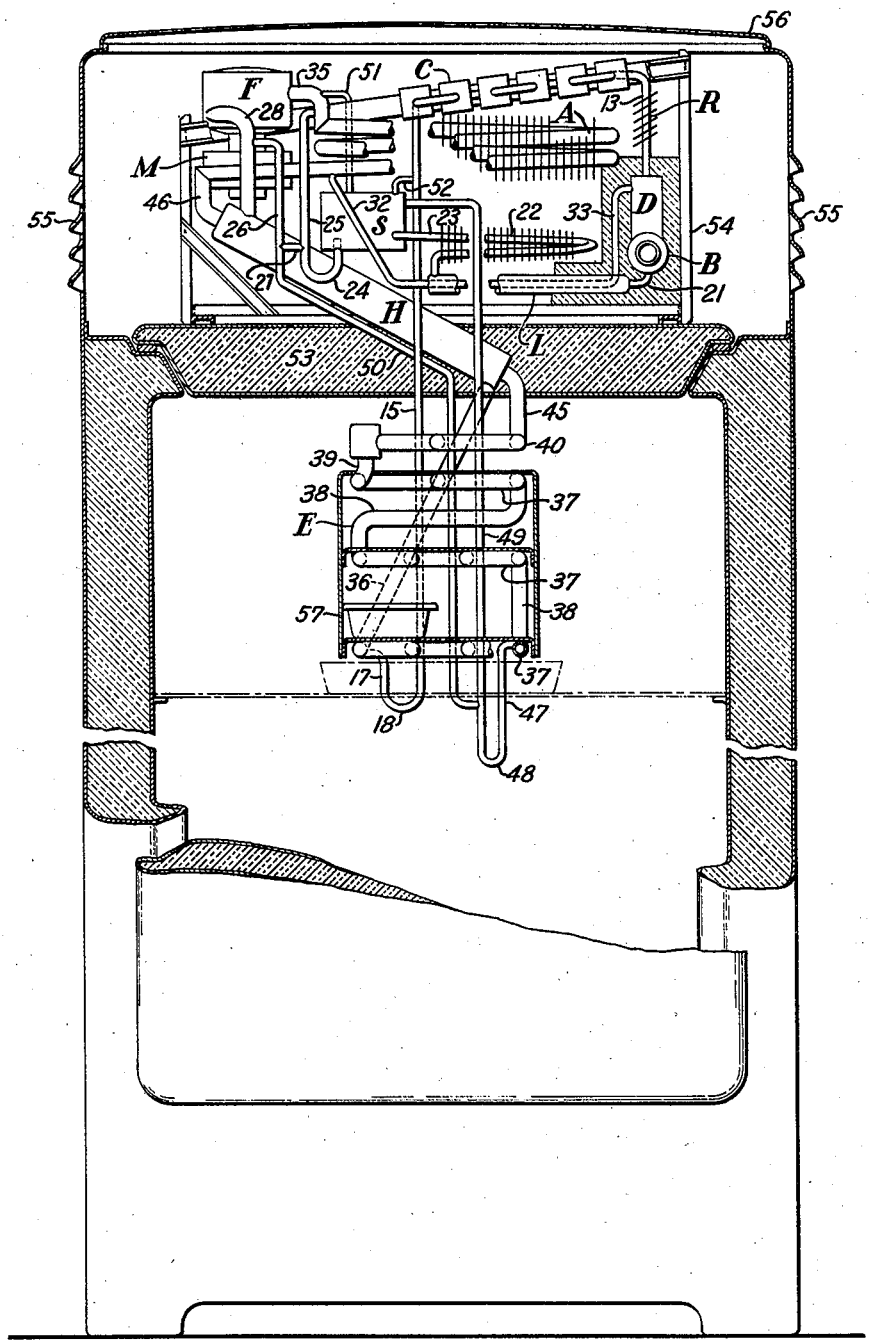
INVENTOR
William H. Kitto
BY
Harry S. Dumars
ATTORNEY Patented Aug. 3, 1943

2,325,778

UNITED STATES PATENT OFFICE 2,325,778

REFRIGERATION

William H. Kitto, Canton, Ohio, assignor to The Hoover Company, North Canton, Ohio, a corporation of Ohio Application September 8, 1941, Serial No. 409,924

19 Claims. (Cl. 62—119.5)

This invention relates to refrigeration and more particularly to an absorption refrigerating apparatus of the pressure equalized type which is mounted on top of a domestic refrigerator cabinet so that the evaporator extends downwardly into the interior of the cabinet and the absorber and generator are mounted on the top wall of the cabinet and in which the refrigerating apparatus is removable from the cabinet as a unit.

In absorption refrigerating apparatus of the pressure equalized type using a refrigerant and an absorption solution, some of the solution vapor is inevitably driven off in the generator along with the refrigerant vapor, is condensed and led to the evaporator with the liquid refrigerant.

Unless some means is provided for purging the evaporator of this condensed solution the evaporator will eventually become filled with the solution or a weak mixture of solution and refrigerant and as a consequence refrigeration will cease.

In the case in which the solution circuit is positioned below the evaporator this is a comparatively simple problem since the solution in the evaporator can be drained to the solution circuit through a liquid trap or otherwise.

However, where the solution circuit is positioned above the evaporator the collection of condensed solution in the evaporator offers a more serious problem.

According to this invention the inert gas is placed under pressure in the inert gas circuit which includes the evaporator and the absorber and this inert gas at its raised pressure is utilized to remove the condensed solution from the evaporator which is positioned below the solution circuit.

Further, according to this invention, the evaporator is so constructed and related to the inert gas circuit in such manner that the inert gas at its raised pressure will blow the liquid in the evaporator including the condensed refrigerant and solution upwardly through the evaporator. During the process the liquid refrigerant will evaporate to produce refrigeration and the condensed solution will be brought back into the solution circuit.

In a refrigerating apparatus of the type having an evaporator in which the liquid is blown upwardly therethrough and in which the apparatus is operated intermittently in accordance with refrigeration demand, there is always some liquid in the evaporator at the end of an operating period. This liquid will flow downwardly through the evaporator coils to the bottom of the evaporator. This liquid which includes liquid refrigerant and some condensed solution is liable to block the lower passage of the evaporator at the start of another operating period.

According to another feature of this invention a portion of the inert gas at its raised pressure is utilized to operate a gas lift pump to purge the evaporator of any liquid contained therein at the start of each operating period.

Other objects and advantages of this invention will become apparent as the description proceeds when taken in connection with the accompanying drawing in which the single figure represents the refrigerating apparatus according to this invention mounted on the top of a domestic refrigerator cabinet.

Referring to the drawing, there is disclosed a three-fluid absorption refrigerating system comprising a boiler B, an analyzer D, an air-cooled rectifier R, a tubular air-cooled inclined condenser C, an evaporator E, a gas heat exchanger H, a tubular air-cooled absorber A, a solution reservoir S, a liquid heat exchanger L, and a circulating fan F which is driven by an electrical motor M. The above described elements are interconnected by various conduits to form a plurality of gas and liquid circuits constituting a complete refrigerating system to which reference will be made in more detail hereinafter.

The refrigerating system will be charged with a suitable refrigerant, such as ammonia, a suitable absorbent, such as water, and a suitable inert pressure equalizing medium, such as nitrogen.

The boiler B will be heated in any suitable manner as by an electric cartridge heater or by a gas burner, as may be desired.

The application of heat to the boiler B liberates refrigerant vapor from the strong solution contained therein. The vapor so liberated passes upwardly through the analyzer D in counterflow relationship to a strong solution flowing downwardly through the analyzer. Further refrigerant vapor is generated in the analyzer by the heat of condensation of absorption solution vapor generated in the boiler.

Some of the solution vapor is also inevitably liberated in the boiler B along with the refrigerant vapor. This solution vapor along with the refrigerant vapor is conducted from the upper portion of the analyzer D to the upper portion of the condenser C through a conduit 13 which includes the air-cooled rectifier R wherein a portion of the absorption solution vapor which leaves the analyzer is condensed and returned to the analyzer through the conduit 13.

The refrigerant vapor and the remainder of the solution vapor is liquefied in the condenser by heat exchange relation with atmospheric air and is discharged from the bottom portion thereof through a conduit 15. The bottom portion of the conduit 15 connects with the bottom portion of an upwardly extending conduit 17 through a U-bend 18. The conduit 17 opens at its upper end into the lower coil of the evaporator E and discharges thereinto in a manner to be more fully described hereinafter. The U-bend 18 is provided for the purpose of creating a liquid trap and preventing the gas under pressure in the bottom coil of the evaporator from being blown back through the conduit 15 into the condenser C as will later become apparent.

The weak solution formed in the boiler B by the generation of refrigerant vapor therefrom is conveyed from the boiler through a conduit 21, the outer pass of liquid heat exchanger L, an air cooled pre-cooler 22 and a conduit 23 into the solution reservoir S. The weak solution is conveyed from the solution reservoir S through a U-shaped conduit 24 which opens into a gas lift pump 25 which in turn discharges into the upper portion of the absorber A. The top of the absorber A is materially above the solution level normally prevailing in the boiler-analyzer reservoir system whereby some means must be provided to elevate the absorption solution into the top of the absorber A. For this purpose a small bleed conduit 27 communicates with conduit 26 which is connected to the discharge conduit 28 of the circulating fan F. The bleed conduit 27 opens into the gas lift pump 25 below the solution level normally prevailing in the reservoir whereby the weak solution is elevated into the top of the absorber by gas lift action.

In the absorber, the weak solution flows downwardly by gravity in counterflow relationship to the rich pressure equalizing medium refrigerant vapor mixture flowing upwardly therethrough. The refrigerant vapor content of the mixture is absorbed in the absorption solution and the heat of absorption is conducted to the surrounding air by air cooling fins which are mounted on the exterior of the absorber vessel. The strong solution formed in the absorber flows into a conduit 32 which opens into the inner pass of the heat exchanger L. From the inner pass of the liquid heat exchanger L, the strong solution is conveyed to the upper portion of the analyzer D by a strong solution return pipe 33.

The lean pressure equalizing medium refrigerant vapor mixture formed in the absorber A is taken from the upper portion thereof through the conduit 35 into the suction side of the circulating fan F in which it is placed under pressure and discharged through the conduit 28 into the outer pass of the gas heat exchanger H. The pressure equalizing medium under pressure is conveyed from the outer pass of the gas heat exchanger H through a downwardly extending conduit 36 into the bottom portion of the evaporator E.

The evaporator E is made up of a plurality of horizontally arranged banks 37 of serpentine tubing connected by multi-stage lift conduits 38 forming the ice-freezing portion of the evaporator. The upper bank 37 is connected by lift conduit 39 to a serpentine box-cooling coil 40 located above the ice freezing portion of the evaporator.

The conduit 17 opens into the bottom portion of the conduit 36 whereby the liquid refrigerant supplied to the evaporator enters the same simultaneously with the pressure equalizing medium which is placed under pressure by the circulating fan F. The conduits forming the entire evaporator are relatively small whereby the pressure equalizing medium flows through such evaporator conduits with a relatively high velocity. The rapidly flowing pressure equalizing medium sweeps or drags the liquid refrigerant along the serpentine coil of the bottom bank 37 thence upwardly through the lower multi-stage lift conduit 38, along the serpentine coil forming the intermediate bank 37, upwardly through the upper multi-stage lift conduit 38, along the serpentine coil forming the upper bank 37, upwardly through the lift conduit 39 and then horizontally through the serpentine coil forming the box cooling coil 40, as the liquid refrigerant is diffusing into the inert pressure equalizing medium to produce refrigeration.

As previously stated, the liquid supplied to the bottom of the evaporator E is a mixture of liquid refrigerant and condensed absorption solution. The inert gas supplied to conduit 36 is comparatively warm and is weak in refrigerant vapor. It is therefore capable of taking up considerable refrigerant vapor as it enters the evaporator E. That being the case a rapid diffusion of refrigerant vapor into the inert gas will take place in the serpentine banks 37 and the multi-stage lift conduits 38 with the result that the ice freezing portion of the evaporator will become extremely cold. By the time the liquid refrigerant and inert gas has reached the box cooling coil 40 there will be little liquid refrigerant remaining and the inert gas will be comparatively cold as well as comparatively rich in refrigerant vapor. This will result in the evaporation of the remaining liquid refrigerant in the coil 40 at a comparatively slow rate with the result that the temperature of the coil 40 will be considerably higher than that of the ice freezing portion of the evaporator E.

By the time the inert gas and remaining liquid leave the coil 40 there will be very little or no liquid refrigerant remaining but there will be a slight amount of condensed solution since the solution evaporates at a higher temperature than the refrigerant. The rapidly flowing rich pressure equalizing medium refrigerant vapor mixture leaving the coil 40 sweeps the remaining liquid with it through the conduit 45, the inner pass of the gas heat exchanger H and conduit 46 into the bottom of the absorber A whereby liquid unevaporated in the evaporator E is returned to the solution circuit. In the absorber A, the rich pressure equalizing medium refrigerant vapor mixture flows upwardly in counterflow to absorption solution which absorbs the refrigerant content of the mixture.

The pressure equalizing medium which enters the evaporator by conduit 36 is under pressure and to prevent this pressure from being blown back through conduit 15 to the condenser the U-conduit 18 which connects the conduits 17 and 15 is provided to form a liquid trap.

Refrigerating systems are usually operated intermittently in accordance with refrigeration demand. At the termination of an operating period the liquid in the conduit 46, the inner pass of gas heat exchanger H, conduit 45, coil 40 and the ice freezing portion of the evaporator E will flow downwardly into the bottom bank 37 of the evaporator. In order to prevent blocking of the bottom bank 37 of the evaporator by this liquid a drain conduit 47 is provided which opens into the top of the coil so that it will not completely drain the bottom bank. The drain conduit 47 is connected by a U-shaped conduit 48 to a gas lift pump 49 of small diameter which opens into the top of the reservoir S above the solution level therein. In order to supply motive power to the gas lift pump 49 a small bleed conduit 50 leads to the junction of the conduit 26 with conduit 27. Since the conduit 26 is connected to the discharge conduit 28 of the fan F, inert gas under pressure will be supplied to the gas lift pump 49 when the fan F is in operation.

At the start of an operating period, the gas lift pump 49 will quickly lift any liquid accumulated in the bottom of the evaporator E into the top of the reservoir S and clear the blockage of the bottom bank 37 of the evaporator so that the circulation of liquid refrigerant and the inert gas through the evaporator will take place as previously described. Thus any condensed absorption solution which may accumulate in the evaporator E will be removed even though it is not blown upwardly through the gas heat exchanger H by the rapidly flowing inert gas. The liquid trap formed in the U-shaped conduit 48 will prevent the gas under pressure supplied by conduit 50 from being blown upwardly into the evaporator E.

The solution reservoir S is vented through a conduit 51 into the suction conduit 35 of the circulating fan. The discharge conduit 15 of the condenser is vented by a vent conduit 52 into the reservoir S above the solution level therein. Since the reservoir is connected by conduit 51 to the suction side of the fan F, the discharge conduit 15 of the condenser will also be at suction pressure.

The refrigerating apparatus just described is mounted upon a removable insulated panel 53 forming a top closure for a domestic refrigerator cabinet. The generator B, condenser C, absorber A, motor M, fan F and their connecting conduits are mounted upon a suitable framework generally indicated at 54 which is mounted on top of the insulated panel 53. The evaporator E is supported by its connecting conduits below the insulated panel 53 so as to project into the interior of the food storage compartment of the refrigerator cabinet. The condenser C is mounted in inclined position above the generator or boiler B and the absorber A while the absorber A is in the form of a coiled conduit below the condenser but above the liquid level in the generator or boiler B.

To provide for the circulation of air over the rectifier R, condenser C and the absorber A, the metallic side panels of the cabinet are extended upwardly and provided with louvred openings 55 for the ingress of cooling air. A removable cover 56 is mounted on top of the upwardly extending walls and is provided with openings for the egress of cooling air. The entire unit including the insulated panel 53 can be moved bodily upwardly when the cover 56 is removed either for servicing or replacement.

The ice freezing portion of the evaporator E is covered with an ornamental casing 57 to hide the evaporator coils and to confine the refrigeration taking place therein to freezing ice. The two bottom banks 37 of the evaporator form supports for ice tray shelves while the top bank 37 is in thermal contact with the top of the casing 57 so that refrigeration taking place therein can be utilized for box cooling purposes. If desired, fins can be bonded to the top of the casing 57 to facilitate this heat transfer.

The conduits 15, 36, 50 and 49 are at the rear of the evaporator E so that ice trays can be readily placed upon and removed from their supporting shelves.

When the liquid is removed from the lower bank 37 by the vapor lift conduit 49 a continuous circulation of inert gas through the conduits 50 and 49 will take place, but since these conduits are of very small diameter the flow will be small and will not interfere with the proper circulation of the remaining fluids in the apparatus.

From the foregoing it can be seen that this invention provides an absorption refrigerating apparatus of the pressure equalized type in which the evaporator is positioned below the solution circuit and the inert gas at a raised pressure is utilized to circulate the absorption solution between the boiler and absorber and to raise the liquid refrigerant upwardly through the evaporator as well as to purge the evaporator of any liquid accumulated therein at the start of each operating period.

While I have shown but a single embodiment of my invention it is to be understood that this embodiment is to be taken as illustrative only and not in a limiting sense. I do not wish to be limited to the specific structure shown and described but to include all equivalent variations thereof except as limited by the scope of the claims.

I claim:

1. A refrigerating apparatus comprising, a cabinet, an absorption refrigerating unit mounted on the top of said cabinet, said unit including an absorber and a condenser on top of said cabinet, a vertically extending evaporator in the interior of said cabinet below said absorber and condenser, an inert gas circuit including said evaporator and absorber, means for placing an inert gas in said circuit under a raised pressure and means for leading the liquid refrigerant from said condenser to the lower end of said evaporator, said evaporator and circuit being so constructed and arranged that the gas at its raised pressure will blow liquid refrigerant upwardly through said evaporator.

2. An absorption refrigerating apparatus comprising a condenser, an absorber, a vertically extending evaporator below said condenser and absorber, an inert gas circuit including said absorber and evaporator, an inert gas in said circuit, means for placing said gas under a raised pressure and means for leading liquid refrigerant from said condenser to the lower end of said evaporator, said evaporator and circuit being so constructed and arranged that said gas at its raised pressure will blow liquid refrigerant upwardly through said evaporator.

3. An absorption refrigerating apparatus comprising a condenser, an absorber, a vertically extending evaporator below said condenser and absorber, an inert gas circuit including said absorber and evaporator, an inert gas in said circuit, means for placing said gas under a raised pressure, means for leading condensed refrigerant from said condenser to the lower end of said evaporator, said evaporator and circuit being so constructed and arranged that said gas at its raised pressure will blow liquid refrigerant upwardly through said evaporator and means for utilizing a portion of said gas at its raised pressure for purging said evaporator.

4. An absorption refrigerating apparatus comprising a condenser, an absorber, a vertically extending evaporator below said condenser and absorber, an inert gas circuit including said absorber and evaporator, means for placing inert gas in said circuit under a raised pressure and means for utilizing a portion of said gas at its raised pressure for purging said evaporator of unevaporated liquid.

5. A refrigerating apparatus comprising a cabinet, an absorption refrigerating unit mounted on the top of said cabinet, said unit including an absorber and a condenser on top of said cabinet, a vertically extending evaporator in the interior of said cabinet below said absorber and condenser, an inert gas circuit including said evaporator and absorber, means for placing an inert gas in said circuit under a raised pressure and means for leading liquid refrigerant from said condenser to the lower end of said evaporator, said evaporator and circuit being so constructed and arranged that the gas at its raised pressure will blow liquid refrigerant upwardly through said evaporator, said unit being removable from said cabinet as a unit.

6. An absorption refrigerating apparatus comprising a generator, a condenser above said generator and connected thereto by a vapor conduit, an absorber below said condenser and above said generator, a vertically extending evaporator below said condenser and absorber, conduits connecting said generator, absorber and evaporator so as to form a solution circuit including said generator and absorber and an inert gas circuit including said evaporator and absorber, means for placing inert gas in said inert gas circuit under a raised pressure and means for utilizing a portion of the inert gas at its raised pressure for lifting solution from the bottom of said evaporator into said solution circuit.

7. An absorption refrigerating apparatus comprising a generator, a condenser above said generator and connected thereto by a vapor conduit, an absorber below said condenser and above said generator, a vertically extending evaporator below said condenser and absorber, conduits connecting the generator, absorber and evaporator so as to form a solution circuit including said generator and absorber and an inert gas circuit including said evaporator and absorber, means for placing inert gas in said inert gas circuit under a raised pressure, means for leading liquid refrigerant from said condenser to the bottom of said evaporator and means for utilizing a portion of the inert gas at its raised pressure for lifting solution from the bottom of said evaporator into said solution circuit.

8. An absorption refrigerating apparatus comprising a generator, a condenser above said generator and connected thereto by a vapor conduit, an absorber below said condenser and above said generator, a vertically extending evaporator below said condenser and absorber, conduits connecting said generator, absorber and evaporator so as to form a solution circuit including said generator and absorber and an inert gas circuit including said evaporator and absorber, means for placing inert gas in said inert gas circuit under a raised pressure, means for leading liquid refrigerant from said condenser to the bottom of said evaporator, said evaporator and inert gas circuit being so constructed and arranged that the gas at its raised pressure will blow liquid refrigerant upwardly through said evaporator and means for utilizing a portion of the inert gas at its raised pressure for lifting solution from the bottom of said evaporator into said solution circuit.

9. An absorption refrigerating apparatus comprising a generator, a condenser above said generator and connected thereto by a vapor conduit, an absorber below said condenser and above said generator, a vertically extending evaporator below said condenser and absorber, conduits connecting said generator, absorber and evaporator so as to form a solution circuit including said generator and absorber and an inert gas circuit including said evaporator and absorber, means for placing inert gas in said inert gas circuit under a raised pressure and means for leading liquid refrigerant from said condenser to the bottom of said evaporator, said evaporator and circuit being so constructed and arranged that the gas at its raised pressure will blow liquid refrigerant upwardly through said evaporator.

10. An absorption refrigerating apparatus comprising a generator, a condenser above said generator and connected thereto by a vapor conduit, an absorber below said condenser and above said generator, a vertically extending evaporator below said condenser and absorber, conduits connecting said generator, absorber and evaporator so as to form a solution circuit including said generator and absorber and an inert gas circuit including said evaporator and absorber, means for placing inert gas in said inert gas circuit under a raised pressure and means for utilizing a portion of the inert gas at its raised pressure for lifting solution from the bottom of said evaporator into said solution circuit, said last named means comprising a gas lift pump.

11. A refrigerator comprising a cabinet having a removable insulated top wall, an absorption refrigerating unit mounted on said top wall, said unit comprising a generator, a condenser above said generator and connected thereto by a vapor conduit, an absorber below said condenser and above said generator, an evaporator below said condenser and absorber, said generator, condenser and absorber being mounted on the top of said insulated wall and said evaporator extending downwardly into the interior of said cabinet below said insulated wall, a solution circuit including said generator and absorber, an inert gas circuit including said evaporator and absorber, means for leading liquid refrigerant from said condenser to the bottom of said evaporator, means in said inert gas circuit for placing inert gas therein under a raised pressure, said inert gas circuit and evaporator being so constructed and arranged that inert gas at its raised pressure will blow liquid refrigerant upwardly through said evaporator, means for utilizing a portion of said inert gas at its raised pressure for circulating solution in said solution circuit and means for utilizing another portion of said inert gas at its raised pressure for returning unevaporated solution from the bottom of said evaporator to said solution circuit.

12. A refrigerating apparatus comprising a cabinet having an insulated top wall, an absorption refrigerating unit mounted on said insulated top wall, said unit comprising a generator, a condenser above said generator and connected thereto by a vapor conduit, an absorber below said condenser and above said generator, an evaporator below said condenser and absorber, said generator, condenser and absorber being mounted on top of said insulated wall and said evaporator extending downwardly into the interior of said cabinet below said insulated wall, a solution circuit including said generator and absorber, an inert gas circuit including said evaporator and absorber, means for leading liquid refrigerant from said condenser to the bottom of said evaporator, means in said inert gas circuit for placing inert gas therein under a raised pressure, said inert gas circuit and evaporator being so constructed and arranged that the inert gas at its raised pressure will blow liquid refrigerant upwardly through said evaporator, gas lift means for utilizing a portion of said inert gas at its raised pressure for circulating solution in said solution circuit and gas lift means for utilizing another portion of said inert gas at its raised pressure for returning unevaporated solution from the bottom of said evaporator to said solution circuit.

13. A refrigerating apparatus comprising a cabinet having a removable insulated top wall, an absorption refrigerating unit mounted on said insulated top wall, said unit comprising a generator, a condenser above said generator and connected thereto by a vapor conduit, an absorber below said condenser and above said generator, an evaporator below said condenser and absorber, said generator, condenser and absorber being mounted on top of said insulated wall and said evaporator extending downwardly into the interior of said cabinet below said insulated wall, a solution circuit including said generator and absorber, an inert gas circuit including said evaporator and absorber, means for leading liquid refrigerant from said condenser to the bottom of said evaporator, means in said inert gas circuit for placing inert gas therein under a raised pressure, said inert gas circuit and evaporator being so constructed and arranged that the inert gas at its raised pressure will blow liquid refrigerant upwardly through said evaporator, means for utilizing a portion of said inert gas at its raised pressure for circulating solution in said solution circuit and means for utilizing another portion of said inert gas at its raised pressure for returning unevaporated solution from the bottom of said evaporator to said solution circuit, said unit being removable from said cabinet as a unit.

14. A refrigerator comprising a cabinet having an insulated top wall, an absorption refrigerating unit mounted on top of said insulated wall, said unit comprising a generator, a condenser above said generator and connected thereto by a vapor conduit, an absorber below said condenser and above said generator, an evaporator below said condenser and absorber, said generator, condenser and absorber being mounted on top of said insulated wall and said evaporator extending downwardly into the interior of said cabinet below said insulated wall, a solution circuit including said generator and absorber, an inert gas circuit including said evaporator and absorber, means for leading liquid refrigerant from said condenser to the bottom of said evaporator, means in said inert gas circuit for placing inert gas therein under a raised pressure, said inert gas circuit and evaporator being so constructed and arranged that inert gas at its raised pressure will blow liquid refrigerant upwardly to said evaporator, gas lift means for utilizing a portion of said inert gas at its raised pressure for circulating solution in said solution circuit and gas lift means for utilizing another portion of said inert gas at its raised pressure for returning unevaporated solution from the bottom of said evaporator to said solution circuit, said last mentioned means opening into said solution circuit above the normal liquid level therein.

15. A refrigerator comprising a cabinet having an insulated top wall, an absorption refrigerating apparatus mounted on said insulated wall, said apparatus comprising a generator, a condenser above said generator and connected thereto by vapor conduits including a rectifier, an absorber below said condenser and above said generator, an evaporator below said absorber and condenser, said generator, condenser and absorber being mounted on top of said insulated wall and said evaporator extending downwardly into the interior of said cabinet below said insulated wall, an inert gas circuit including said evaporator and absorber, means in said inert gas circuit for placing inert gas therein under a raised pressure, means for leading liquid refrigerant from said condenser to the bottom of said evaporator, means including a gas lift pump for circulating solution from said generator to the top of said absorber and for returning it to said generator by gravity and means for utilizing a portion of said inert gas for returning unevaporated solution from the bottom of said evaporator to said solution circuit.

16. A refrigerator comprising a cabinet having a removable insulated top wall, an absorption refrigerating unit mounted on said insulated wall, said unit comprising a generator, a condenser above said generator and connected thereto by a vapor conduit including a rectifier, an absorber below said condenser and above said generator, an evaporator below said absorber and condenser, said generator, condenser and absorber being mounted on top of said insulated wall and said evaporator extending downwardly into the interior of said cabinet below said insulated wall, an inert gas circuit including said evaporator and absorber, means in said inert gas circuit for placing inert gas therein under a raised pressure, means for leading liquid refrigerant from said condenser to the bottom of said evaporator, means including a gas lift pump for circulating solution from said generator to the top of said absorber and for returning it to said generator by gravity and means for utilizing a portion of said inert gas at its raised pressure for returning unevaporated solution from the bottom of said evaporator to the solution circuit above the normal liquid level therein.

17. A refrigerator comprising a cabinet having an insulated top wall, an absorption refrigerating unit mounted on said insulated wall, said unit comprising a generator, a condenser above said generator and connected thereto by a vapor conduit, an absorber below said condenser and above said generator, an evaporator below said absorber and condenser, said generator, condenser, and absorber being mounted on top of said insulated wall and said evaporator extending downwardly into the interior of said cabinet below said insulated wall, an inert gas circuit including said evaporator and absorber, means in said inert gas circuit for placing inert gas therein under a raised pressure, and means for leading liquid refrigerant from said condenser to the bottom of said evaporator, said evaporator comprising a plurality of banks of serpentine tubing connected by multi-stage riser sections, said inert gas circuit being so arranged relative to said evaporator that inert gas at its raised pressure will sweep liquid refrigerant through the banks of serpentine tubing and upwardly through the riser sections as it is evaporating into the inert gas to produce refrigeration.

18. An absorption refrigerating apparatus comprising a generator, a condenser above said generator and connected thereto by a vapor conduit including a rectifier, an absorber below said condenser and above said generator, an evaporator below said absorber and condenser, an inert gas circuit including said evaporator and absorber, means in said inert gas circuit for placing inert gas therein under a raised pressure and means for leading liquid refrigerant from said condenser to the bottom of said evaporator, said evaporator comprising a plurality of banks of serpentine tubing connected by multi-stage riser sections, said inert gas circuit being so arranged relative to said evaporator that inert gas at its raised pressure will sweep liquid refrigerant through the banks of serpentine tubing and upwardly through the riser sections as it is evaporating into the inert gas to produce refrigeration.

19. An absorption refrigerating apparatus comprising a generator, a condenser above said generator and connected thereto by a vapor conduit including a rectifier, an absorber below said condenser and above said generator, an evaporator below said absorber and condenser, an inert gas circuit including said evaporator and absorber, means in said inert gas circuit for placing inert gas therein under a raised pressure, means for leading liquid refrigerant from said condenser to the bottom of said evaporator, a solution circuit including said generator and absorber and means including a gas lift pump for utilizing a portion of the inert gas at its raised pressure for returning unevaporated solution from the bottom of said evaporator to said solution circuit.

WILLIAM H. KITTO.